June 7, 1927.
J. P. EGHOLM
1,631,627
DUMPING TRUCK
Filed Aug. 21. 1925
2 Sheets-Sheet 1
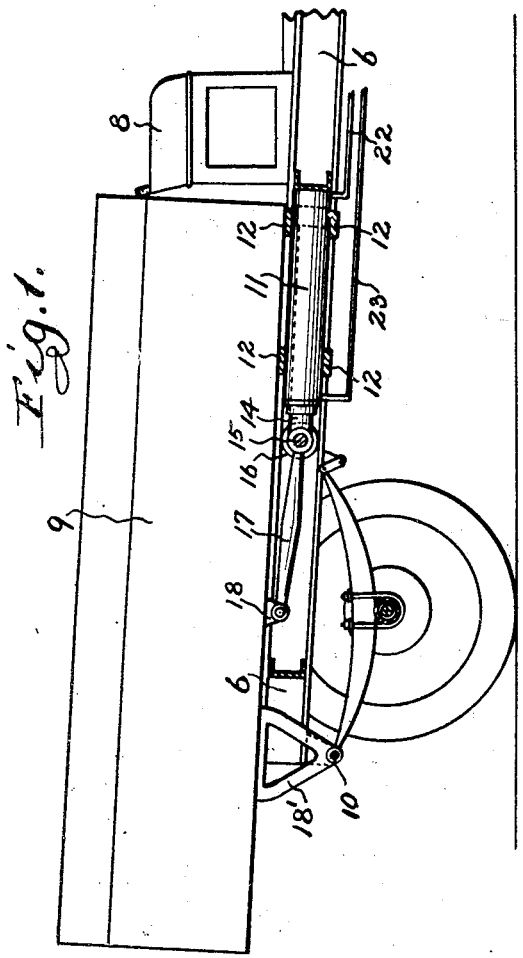
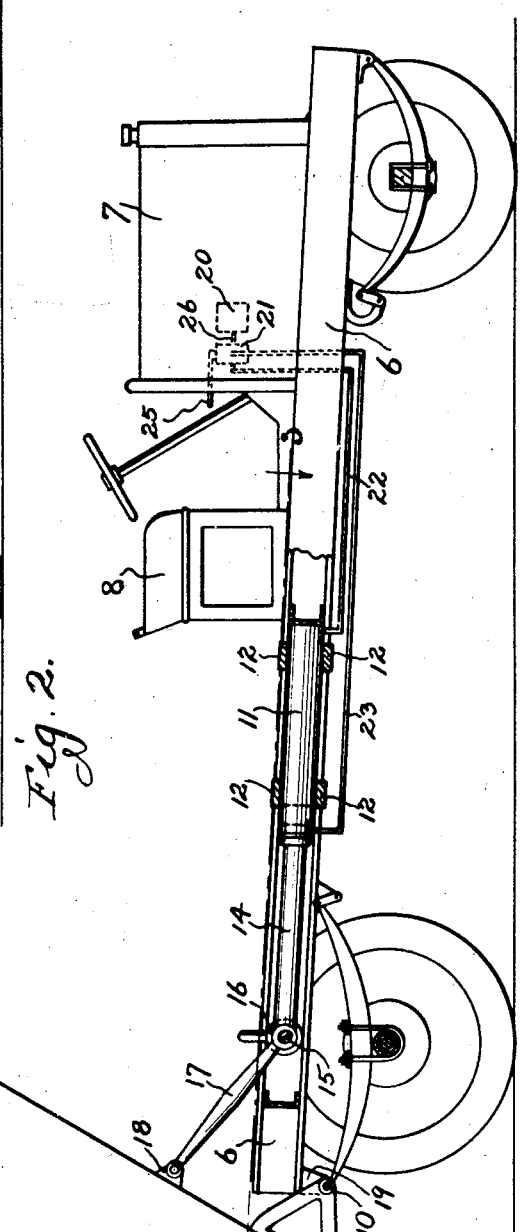
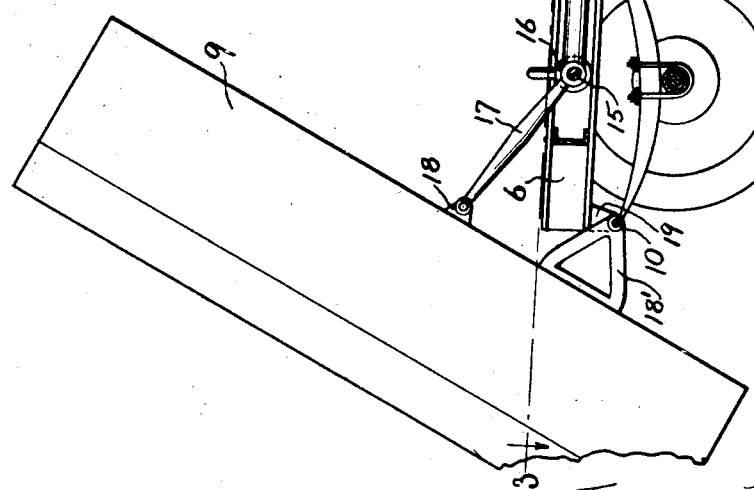
Witness:
Richard J. Jacka
Inventor:
James P. Egholm
By Parker & Carter
Atty June 7, 1927.  J. P. EGHOLM  1,631,627
DUMPING TRUCK
Filed Aug. 21, 1925  2 Sheets-Sheet 2
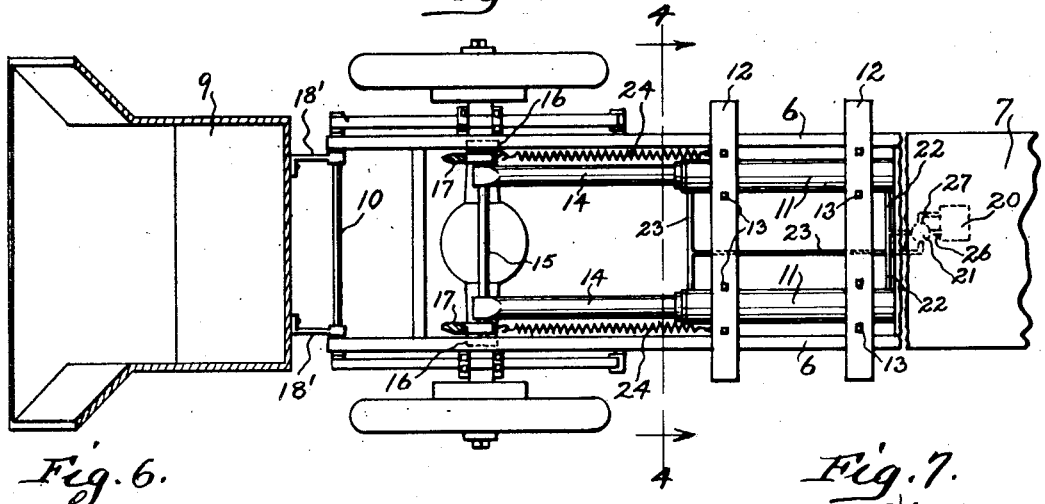
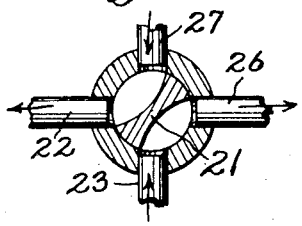
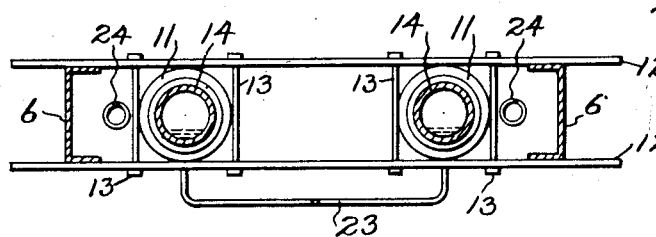
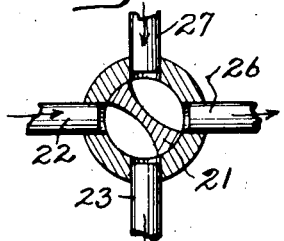
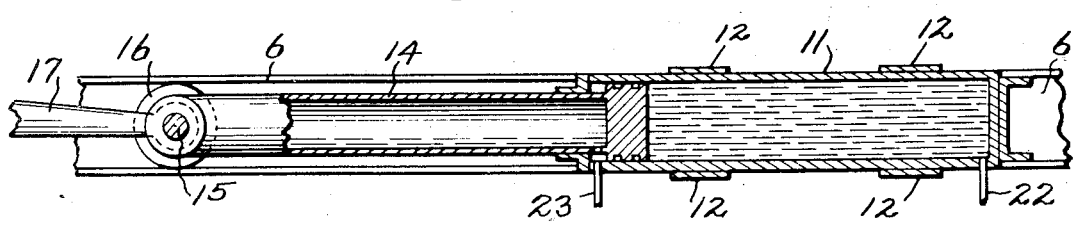
Witness:
Richard J. Jacker
Inventor:
James P. Egholm
by Patented June 7, 1927.

1,631,627

UNITED STATES PATENT OFFICE.

JAMES P. EGHOLM, OF CHICAGO, ILLINOIS.

DUMPING TRUCK.

Application filed August 21, 1925. Serial No. 51,566.

My invention relates to improvements in mechanism for tilting or lifting a load container on motor trucks and has for its objects, first, to provide a plurality of hydraulic cylinders to operate the parts; second, to place the operating mechanism within and below the confines of the standard truck frame; third, to have the load container as short a distance above the ground as possible consistent with the proper operation of the tilting mechanism; fourth, to make a simple, strong and durable construction and other features to become apparent from the description to follow.

In dumping trucks of this character it is very desirable to have a great amount of power with a controlled movement for the dumping mechanism, to have all the operating parts come within the confines of the standard truck frame, to have the load container as close to the ground as possible and to have the least possible number of parts. All these desirable features are attained by the use of my invention which comprises two or more hydraulic cylinders secured between the two side channel bars of a truck frame with their piston rods acting in unison on two or more push rods connected directly to the box or container to be lifted.

To describe my invention so that others versed in the art to which it pertains can make and use the same I have illustrated it on the accompanying two sheets of drawings forming a part of this specification in which:

Figure 1, is a side elevation partly broken away, of a truck embodying my invention showing the box or container down in normal position; Fig. 2, is a similar view showing the box in a raised or tilted position; Fig. 3, is a plan sectional view taken on line 3—3 of Fig. 2; Fig. 4, is a sectional view taken on line 4—4 of Fig. 3, with parts omitted; Fig. 5, is an enlarged longitudinal sectional view of one of the hydraulic cylinders partly in elevation; Fig. 6, is an enlarged sectional view of the controlling valve in position to elevate the box; and Fig. 7, is a similar view showing the valve in position to lower the box.

Similar reference characters refer to similar parts throughout the several views.

The side channel bars of the truck frame are shown at 6, the engine hood at 7, the driver's seat at 8 and the box or container at 9 which is pivotally mounted on rod 10 at the rear end of the channel bars 6. Two cylinders 11 are shown secured in the plane of and between the two channel bars 6, by means of suitable straps 12 and bolts 13, and the outer ends of the piston rods 14 are connected to the cross head 15 which is provided with a roller 16 at each end arranged to travel in the channels of the channel bars 6. Suitable connecting links 17 connect the cross head 15 with brackets 18 secured to the bottom of the box 9. It will be noted that the rod 10 is located at the lower ends of brackets 18' secured to and extending below the bottom of the box 9 and that the brackets 19 which support the rod 10 are secured to and extend below the rear ends of the channel bars 6, so that said rod 10 forming the fulcrum for the box 9 is in a plane considerably below the plane in which the cylinders and their piston rods lie.

From the description thus far given it will be understood that when the box 9 is in its lower normal position as seen in Fig. 1, the pistons and their piston rods will be in their innermost position in the cylinders, and when pressure is applied to force the piston rods out, the box will be moved to its tilted position as seen in Fig. 2. The pressure of liquid, preferably oil, is supplied by a pump 20 located under the engine hood 7 which is customary in trucks of this type. A suitable valve 21 is provided to control the flow of oil between the pump and the cylinders in both directions. It will be understood that the piston rods will be forced outward from the cylinders when the valve is placed in a position to admit pressure through the pressure pipe 22, as shown in Fig. 6, and that the weight of the box 9 will force said piston rods into the cylinders when the valve is placed in a position to permit the release of oil from the cylinders back to the storage chambers in the hollow piston rods through the release pipe 23, as shown in Fig. 7. When the weight of the box 9 is so slight in its raised position that it will not overcome the friction to force the pistons into the cylinders, I provide a plurality of coiled contracting springs 24, to assist forcing the piston rods into the cylinders especially at the start of such movement. The valve handle 25 is within easy reach of the operator or driver and has only to be turned through an arc of ninety degrees to bring it from one position to the other, and obviously when turned to an intermediate position the box can be held in any desired position.

More power may be secured by increasing the number of cylinders with their co-operating pistons connected in the manner shown, to the frame, the cross head 15 and pump 20. This increase of power makes it practical to pivot the box 9 very near its rear end, so that a short portion only, will project beyond the pivot rod 10. This arrangement enables the box 9 in its tilting movement to describe a very wide arc so that it will be nearly perpendicular, thus facilitating the unloading of the truck.

The pipe 26 connects the valve 21 with the inlet port of the pump 20 and the pipe 27 connects the valve 21 with the outlet port of the pump 20, however this particular connection between the valve and pump may be changed without deviating from my invention. It will be understood that the size, form and arrangements of the parts may be changed without in the least departing from the scope of my invention.

Having thus fully described my invention what I claim as new and desire to secure by Letters Patent of the United States is:—

In a device of the class described a truck chassis frame including generally parallel, inwardly channelled frame members lying in a generally horizontal plane, a dumping body pivotally mounted at the rear of said truck chassis frame and arranged to rest upon the frame when in normal position, and means for raising and lowering said body about said pivot, including a plurality of hydraulic cylinders and pistons therein, said cylinders and pistons being located within the space bounded by the horizontal planes in which lie the upper and lower edges of the frame members, an actuating connection between the outer ends of said pistons and the dump body, and rollers connected with the free ends of the piston rods, riding in the chassis frame member channels, and adapted to guide the pistons in parallelism with said channels.

Signed at Chicago, county of Cook and State of Illinois, this 17th day of August 1925.

JAMES P. EGHOLM.